United States Patent [19]

Renton

[11] Patent Number: 5,012,514
[45] Date of Patent: Apr. 30, 1991

[54] HARD DRIVE SECURITY SYSTEM

[76] Inventor: Paul Renton, 14926 20th SW., Seattle, Wash. 98166

[21] Appl. No.: 543,429

[22] Filed: Jun. 26, 1990

[51] Int. Cl.$^5$ .............................................. H04L 9/00
[52] U.S. Cl. ........................................ 380/4; 380/52; 364/280.9
[58] Field of Search ..................... 380/3, 4, 23, 26, 52; 340/825.34; 364/280.2, 280.8, 969.1, 969.4, 969.3, 975.2

[56] References Cited

U.S. PATENT DOCUMENTS

| | | | |
|---|---|---|---|
| 4,634,807 | 1/1987 | Chorley et al. | 380/4 |
| 4,757,533 | 7/1988 | Allen et al. | 380/25 |
| 4,937,861 | 6/1990 | Cummins | 380/4 X |
| 4,951,249 | 8/1990 | McClung et al. | 380/23 X |

*Primary Examiner*—Thomas H. Tarcza
*Assistant Examiner*—Tod Swann

[57] ABSTRACT

A security system to prevent un-authorized access to the hard drive of a personal computer system. The security system consists of a plug-in expansion card containing a program on an EPROM, a device driver program which requests the password for access, and other programs to establish the valid passwords for the security system, provide an audit trail of computer access, and other functions. The program on the EPROM disables the floppy drives until a valid password has been entered, forcing the booting process to be controlled and forcing the computer to boot off of the hard drive and request a password via the device driver. A skilled programmer, even with a complete knowledge of the security system's details of operation, can not write a program which can be booted off of a diskette in order to bypass the security system. The passwords and user IDs for the security system are stored on the hard drive of the computer inside the device driver program. The elimination of the need to provide any random access memory, EEROM or other non-volatile memory in which to store the passwords contributes to the low manufacturing cost for the security system.

16 Claims, 1 Drawing Sheet

HARD DRIVE SECURITY SYSTEM

BACKGROUND OF THE INVENTION

The present invention relates to a computer security system for a personal computer with a hard drive, with specific application to the IBM line of personal computers, and computers which are compatible with the IBM line of personal computers.

Many individuals and businesses use personal computers to store and process information. A business or professional person, such as an attorney or a medical doctor, may have information that must be kept confidential, such as privileged communications from clients or results of medical tests. Trade secrets and other proprietary information may also be stored on the hard drive of a computer system, and a means to provide for the security of this information is essential in order to protect the unauthorized disclosure of such information. Additionally, thefts of information from a computer system, including the client lists, financial records, personnel records, and other company information can produce disastrous results for a company.

As the need for computer security systems developed, attempts were made to develop a practical security system which would prevent unauthorized access to a computer system. Password security systems were developed that required entry of a password in order to access the computer or particular files, but these password security systems could often be bypassed by a skilled programmer, and in some cases, by simply booting the operating system for the computer off of a diskette. Some of these password security systems incorporated a hardware device which prevented any access to the system until a valid password was entered. However, due to their means of construction, these security systems were not able to be provided to the personal computer users at a sufficiently low price to encourage their widespread use.

SUMMARY OF THE INVENTION

It is the object of this invention to provide a password-based security system which prevents unauthorized access to a computer system.

Another objective of the invention is to provide a security system for personal computers which can be manufactured at a sufficiently low cost so as to allow the invention to be widely available and easily affordable for users of personal computers.

A further object of the invention is to provide a password-based computer security system which can not be bypassed, even by a skilled programmer with a full knowledge and understanding of the security system and its programming.

A still further objective of the invention is to provide a computer security system in a manner that utilizes both hardware and software, with each contributing to the computer security system, and in such a manner that the removal of the software portion of the security system will not allow access to the computer system.

The present invention is explicitly described with use on the IBM personal computer or an IBM-compatible personal computers, although changes and modifications may be made without departing from the scope and spirit of the invention, including the use of the invention on a different personal computer.

The security system consists of a hardware security device provided on an expansion card, and software to operate the security system provided on a diskette. The passwords used in the security system are stored upon the hard drive of the computer, and the use of the personal computer's existing memory on the hard drive allows the security system to be supplied without any random access memory or EEROM on the expansion card. The personal computer security system of the present invention includes as its hardware portion an expansion card for insertion into an expansion connector of a personal computer. This expansion card carries an EPROM on which is contained object code for the security system. The expansion card also contains interface logic to address the EPROM and interface the EPROM to the expansion bus provided by the expansion connector. The program stored on the EPROM is executed by the computer during its boot procedure, and this program alters the interrupt functions of the computer in such a manner so as to not allow the computer to boot the operating system off of a diskette, and to modify the keyboard input of the computer in such a manner so as to not allow the security system to be bypassed by any keyboard input. The program on the EPROM also checks for the existence of the software portion of the security system, and denys access to the computer system if the software portion is found to be missing. The advantage of preventing the computer from booting the operating system off of a diskette is that it requires that the booting procedure follows a very specific sequence, only using files which exist on the hard drive, thus preventing a programmer from creating a program which could bypass the security system, even if the programmer had a thorough knowledge and understanding of the security system and its operation.

The software portion of the personal computer security system consists of a device driver called SECURITY.BIN, which prompts the user for a password, collects the password from the user, and checks the validity of the password. Also included in the software portion of the security system are a number of other utility programs, which allow the passwords for the system to be established, provide an audit trail of users who have logged onto the system, and other functions. The SECURITY.BIN device driver also checks for the existence of the hardware portion of the security system, by examining the memory locations at which the hardware security card could be installed. If the hardware portion is found missing, access to the computer system is denied.

A device driver is used for the SECURITY.BIN program in order to guarantee that the SECURITY.BIN program will be executed by the computer when it is booting the operating system. If the program were included in the AUTOEXEC.BAT file for execution, as has been done by some security systems, the user may be able to interrupt the AUTOEXEC.BAT file execution from the keyboard, thereby bypassing the security system.

The passwords and status information for the security system are stored on the hard drive of the personal computer inside the SECURITY.BIN device driver program. Utilizing the hard drive itself for storage of the passwords eliminates the need to use costly random access memory or EEROM or other non-volatile memory devices to store the passwords and security system status information, contributing to the desired object of a low manufacturing cost for the security system.

DETAILED DESCRIPTION OF THE INVENTION

Figure 1:
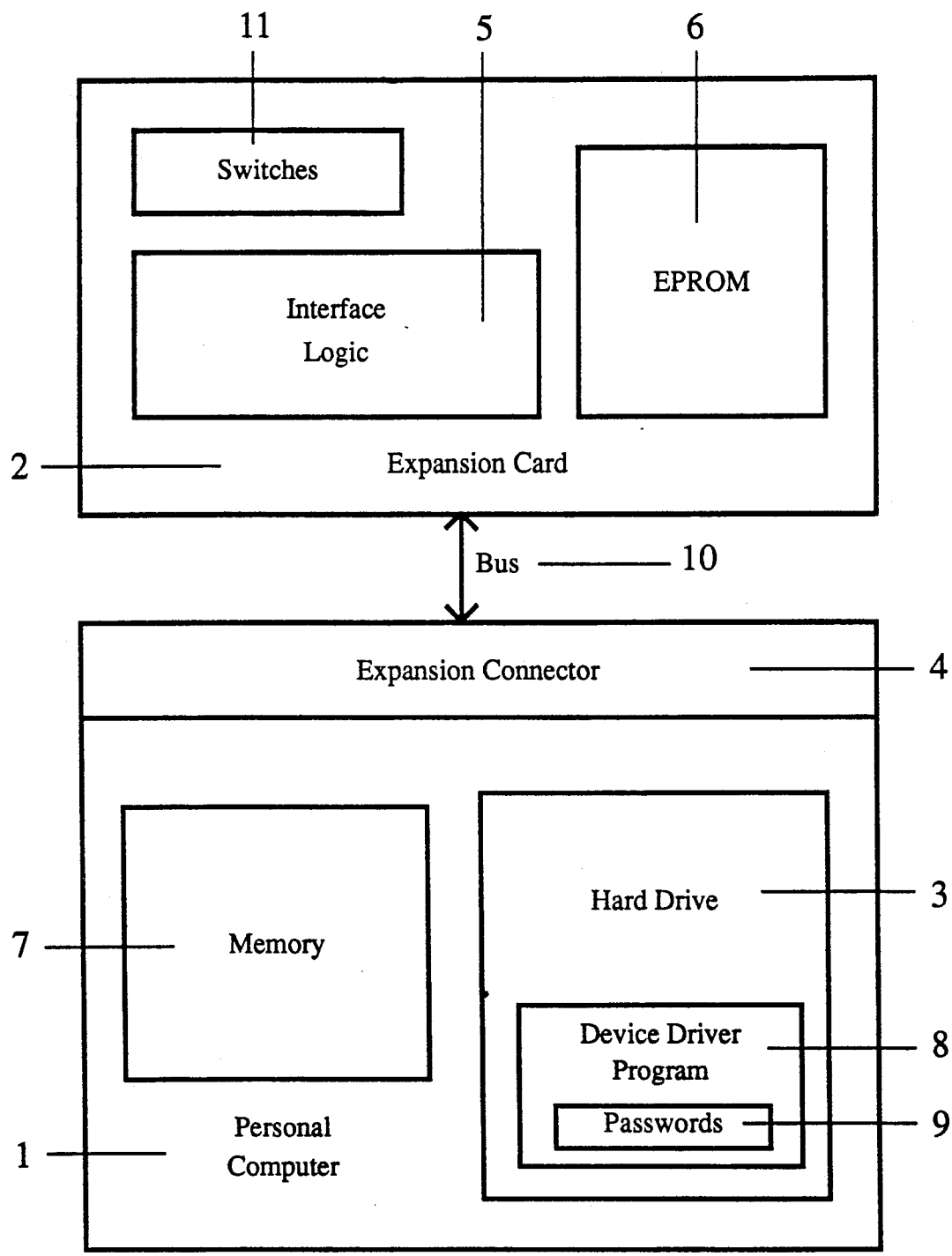
FIG. 1 is a drawing of drawing of the security system, showing the computer and its hard drive, the device driver program and the passwords, and the expansion card containing the EPROM and the interface logic.

A preferred embodiment of the invention will now be described, in relation to its use in an IBM personal computer or an IBM-compatible personal computer, utilizing the MS-DOS operating system.

The hardware security device consists of an EPROM 6, which contains programming to establish the security system in the computer system 1, and interface circuitry 5 to connect the EPROM to the computer bus 10. The hardware security device is provided on an expansion card 2 for connection to the computer via an expansion connector 4. The power for the hardware security device is derived from the computer via the expansion connector.

The address and data connections of the EPROM are connected directly to the address and data connections on the computer bus. The most significant address lines from the computer bus are connected to the interface logic, along with the address enable and memory read control lines. The interface circuitry is used to develop a signal that is used to enable the output of data from the EPROM. This signal must be active whenever the computer is accessing the location in memory at which the hardware security device is established. A set of switches 11 is used to select the address at which the hardware security device resides in memory. The addresses can be can be in the range of addresses from C0000H up to E0000H. Address lines A17, A16, A15, A14 and A13 are connected to 5 inverter inputs of a 74LS04. The inputs to, and outputs from, the inverters are connected to the address selection switches. Each switch selects either a true or inverted address line and presents the selected signal to one input of a 74LS30 8 input NAND gate. The address enable (AEN) line is inverted with the remaining gate of the 74LS04, and is presented to a 74LS30 input. Address lines A19 and A18 are presented directly to the other 74LS30 inputs. The output from the NAND gate will go low only when the desired address is requested by the computer via the expansion bus. The EPROM enable signal will be active for a range of 8192 addresses, as the lower 13 bits of the address bus are not decoded by the address selection logic, and are instead routed directly to the address line inputs of the EPROM. The EPROM used is a 2764 8K by 8 EPROM, which has a total of 8192 memory locations. The EPROM enable signal is connected to the enable input of the EPROM, and the memory read signal from the expansion bus is connected to the output enable of the EPROM. In this fashion the EPROM is selected whenever the computer is reading data from the desired address range.

As the computer performs its booting actions, the basic input/output system (BIOS) of the computer will scan the locations from C0000H up to E0000H searching for BIOS extension ROMS. The BIOS does this by looking for the flag bytes 55H and AAH. When the BIOS sees these two flag bytes, the next byte is assumed to be the number of 512 byte sectors that the BIOS extension ROM occupies. The BIOS then performs a checksum operation by addin˙ tc ˙ether all of the bytes from the 55H and AAH flag bytes up through the last byte of the last 512 byte sector. The result of this operation must be 00H, in modulo 256. The EPROM programming is performed so that a byte is modified when programming the EPROM such that this checksum will yield the correct result. Once the BIOS has established that the BIOS extension ROM exists and has the correct checksum, the BIOS will perform a far call to the location after the size byte (three bytes after the 55H flag byte). The purpose of this call is to allow the BIOS extension ROM to perform any needed initialization functions that it requires. The extension ROM can then return with a far return, which causes the BIOS to continue its scanning operations for the next BIOS extension ROM.

When the EPROM in the security system has been called by the BIOS, the program establishes a new interrupt vector for the keyboard interrupt (9H) and the disk drive management interrupt (13H). The previous values of these vectors are placed in new locations of the interrupt table in the existing memory 7 of the personal computer 1, so that the security system program can continue the keyboard or disk drive action by jumping to the previous interrupt vector. The new interrupt routines are used to establish the security system as a part of the computer's operating system.

When writing the relocated copies of the previous interrupt vectors, the security system program provides a flag byte with each interrupt vector which reflects the status of the security system, and a checksum of the interrupt vector and the flag byte. These relocated interrupt vectors, along with a copy of the flag byte and the checksum, are written in a number of predetermined locations in the interrupt table (8 copies of each interrupt vector are written), in locations in the interrupt table at which usually no interrupt is used. The multiple copies of these interrupt vectors, along with the checksums, are used so that if another program writes over or modifies an interrupt vector that would be used by the security system, another copy of the interrupt vector would still exist. B analyzing the checksum of the interrupt vector and the flag byte, the security system can establish which interrupt vector to use to continue the interrupt action, allowing compatibility with programs which set up software interrupts for their own use. Eight copies of these interrupt vectors allows for a number of these interrupt vectors to be corrupted without creating software compatibility problems.

The flag byte is used to indicate the current status of the security system. A status of 1 indicates that the security system has not yet received a valid password, and a status of 0 indicates that the security system has received a valid password. When initially writing the previous interrupt vectors and the flag bytes into the interrupt table, the value written for the flag byte is 1.

In order to determine the status of the flag byte the security system needs to search the pre-determined locations at which the copies of the interrupt vectors are placed, perform a checksum operation on a location by serially adding the contents of the interrupt table for the locations of the interrupt vector and the flag byte. The checksum computed is then compared against the checksum in the interrupt table. Once a location is found where the checksum for the interrupt vector and flag byte matches the checksum in the corresponding memory location, the interrupt vector and the flag byte have been verified as valid. The security system can then read the flag byte from the location which has been verified as not being corrupted, and the security system can thereby obtain the status of the security system.

The new disk drive management interrupt is called whenever any of the disk drives (either a floppy disk drive or a hard drive) is used. When the flag byte indicates that the security system has already received a valid password, the new disk drive interrupt simply jumps to the previous disk drive management interrupt, allowing normal use of the computer system. When the flag byte indicates that the security system has not yet received a valid password, the new disk drive interrupt evaluates what type of drive is being used by the interrupt function call. If the function requested in the interrupt is for the floppy disk drives, then the interrupt will return an error code, showing that the drive is not available. In the case of a call to initialize a floppy disk drive, then the new disk drive management interrupt will also print a message on the screen which informs the user that floppy disk drive access is denied. When a hard drive is the target drive of the interrupt then the new disk drive interrupt passes the interrupt function call to the previous disk drive management interrupt, allowing normal use of the hard drive. The result of these actions is that the floppy drive(s) of the personal computer do not function in their usual fashion until a valid password has been entered. This forces the computer to boot the operating system off of the hard drive 3, and does not allow the computer to boot the operating system off of a floppy drive. Since the computer cannot be booted off of a floppy diskette, the booting procedure is controlled and secure, and the computer must boot its operating system off of the hard drive. This prevents a user from placing a diskette into a floppy disk drive and booting a program which bypasses the security system. The call to initialize the BIOS extension ROM occurs before any attempt is made to read a diskette from the floppy drive(s), and the floppy drive cannot be used to read any diskette once the BIOS extension ROM has been initialized. Therefore, even with a complete knowledge of the operation and programming of the security system a program could not be written which could be booted from a floppy drive in order to bypass the security system.

The new keyboard interrupt is used to disable the function of the Control and Alternate keys on the keyboard. This function is accomplished by masking bits 2 and 3 of the keyboard status keys at location 00417H to zeros. These bits represent the status of the Control and Alternate keys, and masking these bits to zero values is operative to force the computer system to act as if these keys are never pressed. The purpose of this action is to prevent any Control or Alternate keystroke combinations from interrupting the procedures used to boot the operating system of the computer from the hard drive. The new keyboard interrupt checks the status of the CS flag byte in order to determine if the action of masking the Control and Alternate key bits in the keyboard status register is t be performed. If the status shows that the security system has not yet received a valid password, then the Control and Alternate key bits in the keyboard status register are masked to zero. If the security system has received a valid password, then the action of masking these bits is omitted, thereby allowing the Control and Alternate keys to perform normally.

A further action performed by the program in the EPROM of the security system is to verify that the software portion of the security system is correctly installed. To perform this function, the program must use the BIOS interrupt calls to read the hard drive 3, as the disk operating system has not yet been installed. Using the INT 13H interrupt functions, the program reads the partition table located on the drive 3 to locate the bootable drive, and reads information from the boot sector which describes the number of cylinders, number of heads, and other information about the bootable drive. This information is placed in the computer memory by the program, utilizing RAM storage 7 which is available on a temporary basis while the BIOS extension ROM program is executing. Currently the memory used resides near location 30000H. This temporary storage memory is only needed while the BIOS extension ROM portion of the security system program is executing, and the use of the existing RAM 7 of the computer 1 eliminates the need to provide any RAM with the security system, thereby providing a lower manufacturing cost. Once the information concerning the drive type has been read from the boot sector, the program uses the information obtained in order to locate on the drive 3, using INT 13H BIOS interrupt calls, the CONFIG.SYS file and the SECURITY.BIN file. These files are read into the temporarily used RAM 7 of the computer 1 and checked to establish that the security system has been installed.

If the software for the security system is removed, the hardware security card can detect the absence of the software and prevent access to the computer system. This provides a benefit in that a user can not intentionally or accidentally remove the software for the security system without causing access to the personal computer to be denied until the software is reinstalled.

After the BIOS extension ROM program has set up the new interrupt and established that the security system software is correctly installed, the program performs a far return, allowing the BIOS to continue its normal operations to boot the computer system. If the program found that the software was not installed, then a message is printed on the screen which informs the user that system access is denied as the system configuration is improper, and access to the computer system is denied by forcing the program into an infinite loop which cannot be broken. Another attempt to enter the computer system requires resetting the computer or turning the computer off and back on.

After the program in the EPROM 6 returns control back to the computer BIOS, the BIOS completes its search for other BIOS extension ROMs and then proceeds to load in the operating system. Since the program in the EPROM has made the floppy drives inoperable, the operating system must be loaded in from the hard drive 3.

As a part of the initialization of the operating system, the MS-DOS operating system reads a file called CONFIG.SYS and installs any device drivers listed in that file. As the first line of the CONFIG.SYS file, the security system contains the line DEVICE=SECURITY.-BIN, which tells the operating system to load in and initialize the program SECURITY.BIN as a device driver 8. The EPROM program checks the CONFIG.-SYS file for this line in order to determine that the software for the security system is correctly installed. MS-DOS will always check for the device drivers in the CONFIG.SYS file and initialize these drivers, regardless of any actions on the keyboard. In this manner the SECURITY.BIN program 8 will always be called when the operating system boots.

The SECURITY.BIN device driver program 8 prompts the user to enter a password and an optional user ID. The program 8 contains, in scrambled form, the established passwords 9 and user IDs for the security system. The program compares an entered password against the list of established passwords, and denys access to the computer system if the password does not match any valid password. When access is denied the program will prompt for another password entry. After three invalid password entries an alarm is sounded via the computer's internal speaker, and the escape key must be pressed to reset the computer. If the password is accepted, the program returns control to the operating system, allowing the computer system to perform normally. Just before the program returns control to the operating system, the flag bytes in the interrupt table are changed, along with their corresponding checksums, to inform the BIOS extension ROM portion of the security system of the new status of the security system (a valid password has now been entered).

Storing the passwords and user IDs inside the SECURITY.BIN program on the hard drive eliminates the need for any RAM or EEROM to store the passwords, contributing to the low production cost of the invention.

The SECURITY.BIN device driver program 8 checks for the existence of the hardware security card 2 by reading memory locations from C0000H up to E0000H, and checks to see that a BIOS extension ROM is found with the 55H and AAH flag bytes. The device driver program then checks that the BIOS extension ROM program is the correct program by comparing the contents of certain memory locations of the found program against contents of certain memory locations of the device driver program. If the hardware security card 2 is not found, then access to the computer system is denied without asking of any passwords. Simple removal of the hardware security card causes the security system to deny access to the computer system unless the security system software is also removed. Removal of the hardware security card would allow the computer to boot a diskette in a floppy drive in order to bypass the security system, however, the device driver program 8 checking for the existence of the hardware security card 2 provides some added protection from a user attempting to gain quick access to the computer by quickly removing the card 2 and attempting to boot the computer from the hard drive 3.

The passwords 9 are broken down into a master password, which is used to establish the list of user IDs and passwords, and up to 15 user passwords. The number of user passwords can be changed by altering the SECURITY.BIN program 8, without requiring any changes to be made to the hardware security device 2. Along this same line, other features can be added to the security system to customize the security system to a particular application without any changes needing to be made to the hardware security device.

A program called LOCK.COM is used to enter new passwords and alter the SECURITY.BIN program sections which contains the scrambled password list. The LOCK program requires the master password to be entered in order to make changes to this password list. The LOCK program then reads the password list from the SECURITY.BIN program file and de-scrambles the data, allows editing of the password list, and replaces the password list in the SECURITY.BIN program so as to establish the new list of passwords.

The SECURITY.BIN program retains a copy of the password and user ID that was used to enter the system. A program called TRAIL can read this information from the SECURITY.BIN program, and build a file which provides an audit trail of access to the computer system. This file is scrambled and compressed, and is a system hidden file. A program called AUDIT prompts for the master password and then, once the master password has been entered, de-scrambles this audit trail file into a plaintext file which can be viewed or printed in order to analyze the access to the computer system.

While a specific embodiment of the invention has been described, it is to be understood that changes and modifications to the invention may be made without departing from the scope and spirit of the invention, as set out in the appended claims.

What is claimed is:

1. A security system for controlling access to a personal computer, said computer containing a hard drive, a random access memory, and at least one expansion slot, comprising:

an expansion card for insertion into said expansion slot;

a file residing on said hard drive containing the established passwords of the security system;

said expansion card containing a read only memory for storing a first program having a first portion for altering the interrupt table of the personal computer so as to establish said first program as a part of the disk drive management interrupt of said computer, and further operative to write into a new location in said random access memory the initial values of the interrupt table altered by said first portion of said first program;

said first program having a second portion operative to store in said random access memory one or more flags indicative of the status of the security system;

said first program having a third portion responsive to said one or more flags and the disk drive management interrupt of said computer, operative to deny access to any floppy disk drives while said flags indicate that the security system is active by returning an error code to said computer;

a second program existing upon, and executed from, said hard drive, operative to read said file existing upon said hard drive containing the established passwords of the security system, and operative to request and verify a password against said file, and operative to deny access to the computer system until a valid password is entered, and further operative to modify said one or more flags in said random access memory so as to reflect the current status of the security system.

2. A security system as recited in claim, where the second program is a device driver.

3. A security system as recited in claim 2, where the established passwords are stored in said device driver file upon said hard drive.

4. A security system as recited in claim 3, where the established passwords stored in said device driver are stored in a scrambled or encrypted form.

5. A security system as recited in claim 1, where the memory address for the read only memory is in the address range of C0000H up to and including E0000H.

6. A security system as recited in claim 1, where said first portion of said first program alters the interrupt 13H vector to point to a portion of said first portion of said first program.

7. A security system as recited in claim 1, where said first portion of said first program writes into the existing memory of said computer a checksum which is the serial addition of the initial values of an interrupt table entry and said one or more flags.

8. A security system as recited in claim 7, where said one or more flags, said initial interrupt table entries, and said checksums are placed in a plurality of locations in said existing memory of said computer system.

9. A security system as recited in claim 3, where said valid password is stored inside of a copy of said device driver in memory, so as to provide said valid password to other programs designed to read said valid password.

10. A security system as recited in claim 9, where a third program reads said valid password from said device driver and creates a file which contains the valid passwords, so as to create an audit trail of computer access.

11. A security system as recited in claim 1, where said first program is further operative to alter the keyboard input by altering the keyboard interrupt vector, and said first program is still further operative to eliminate the actions of certain keystrokes, so as to prevent keyboard actions from affecting the boot procedure.

12. A method of providing a security system and denying authorized access to a personal computer, said computer containing a hard drive, a random access memory, and at least one expansion slot, said method comprising:

establishing a file on said hard drive which contains the established passwords for the security system;

temporarily disabling the operation of any floppy drives of the computer with an expansion card inserted into said expansion slot, said expansion card containing a first program which alters the disk drive management interrupt of said personal computer, operative to establish said first program as a part of the disk drive management interrupt of said computer, so as to force the personal computer to boot the operating system from said storing in said random access memory one or more flags indicative of the status of the security system;

collecting and verifying the validity of a password with a second program existing upon and executed from said hard drive, where said second program establishes the validity of a password by comparison with said file on said hard drive containing the established passwords of the security system;

denying access to the computer system until a valid password is entered;

modifying the one or more flags in said random access memory to indicate the new status of the security system;

re-enabling the operation of any floppy drives of the computer once a valid password has been entered.

13. The method as recited in claim 12, where the second program is a device driver.

14. The method as recited in claim 13, where the established passwords for said security system are stored in said device driver file on said hard drive.

15. The method as recited in claim 14, where the established passwords stored in said device driver are stored in a scrambled or encrypted form.

16. The method as recited in claim 12, where said first program alters the interrupt 13H vector to point to a portion of said first program.

* * * * *

UNITED STATES PATENT AND TRADEMARK OFFICE
CERTIFICATE OF CORRECTION

PATENT NO. : 5,012,514

DATED : April 30, 1991

INVENTOR(S) : Renton

It is certified that error appears in the above-identified patent and that said Letters Patent is hereby corrected as shown below:

Column 9, line 26, "authorized" should read --unauthorized--

Column 10, line 6, after "said" should read --hard drive;--.

Signed and Sealed this

Seventeenth Day of September, 1991

*Attest:*

HARRY F. MANBECK, JR.

*Attesting Officer*  *Commissioner of Patents and Trademarks*